L. W. MITTENDORFF.
NEST.
APPLICATION FILED JAN. 29, 1910.
1,038,627.
Patented Sept. 17, 1912.
2 SHEETS—SHEET 1.
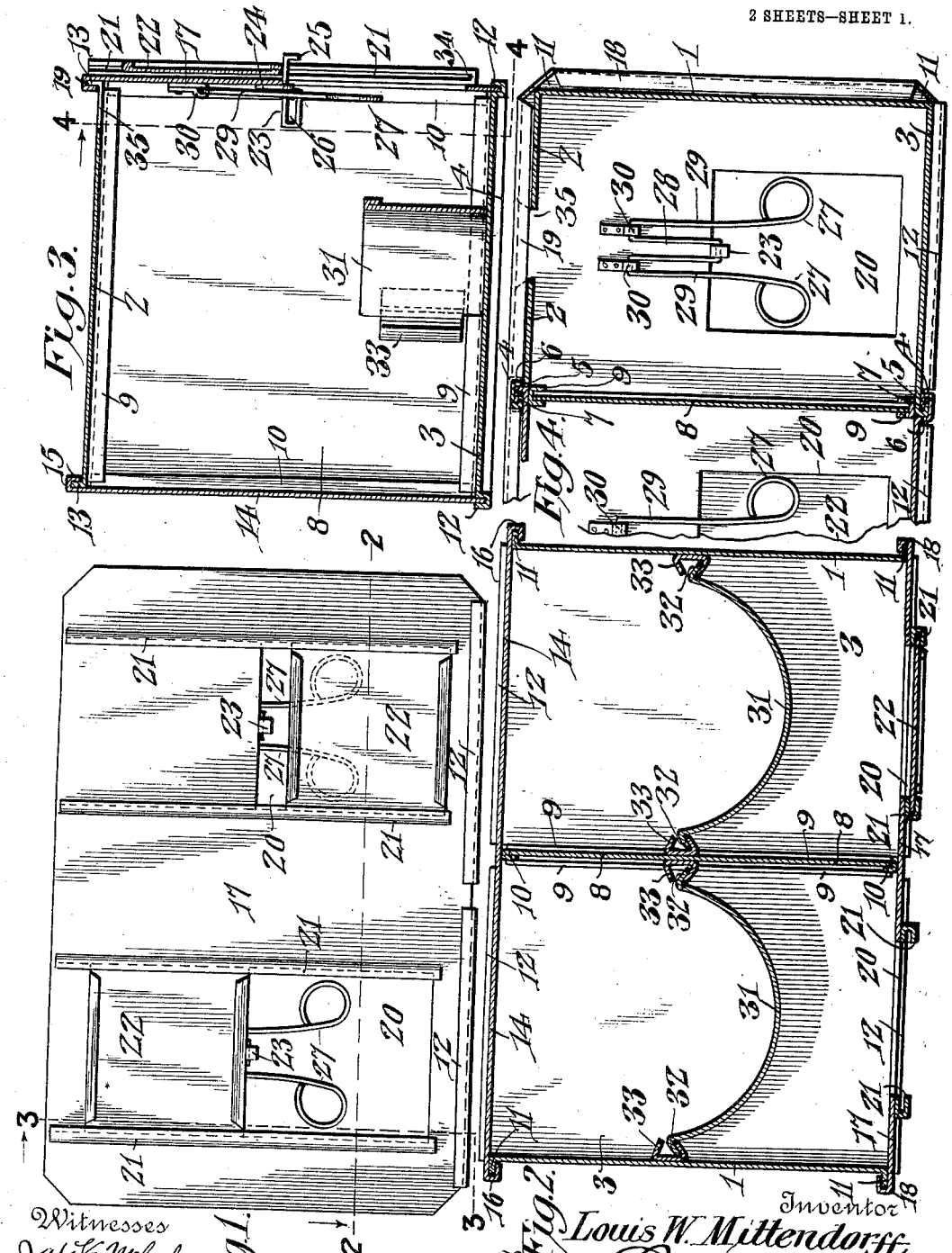
Witnesses
Inventor
Louis W. Mittendorff,
By
Attorney L. W. MITTENDORFF.
NEST.
APPLICATION FILED JAN. 29, 1910.
1,038,627.
Patented Sept. 17, 1912.
2 SHEETS—SHEET 2.
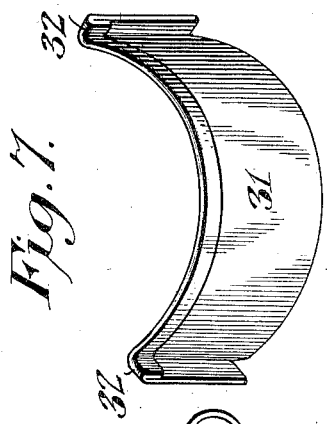
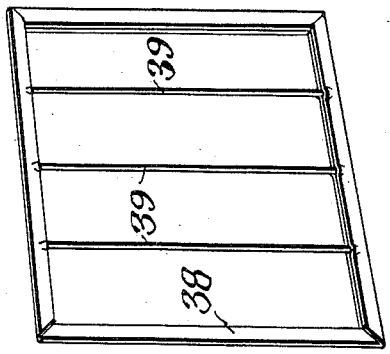
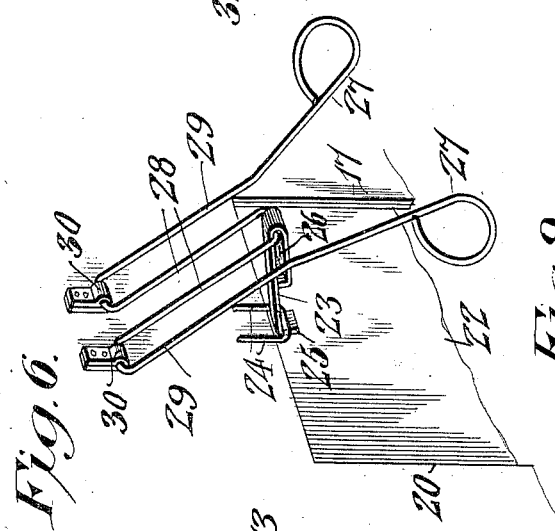
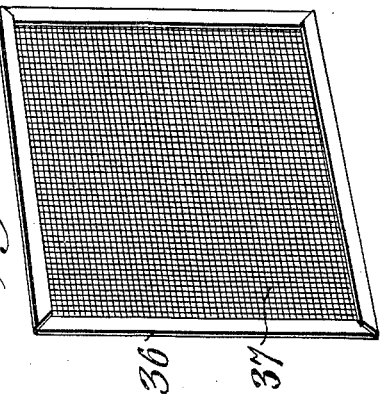
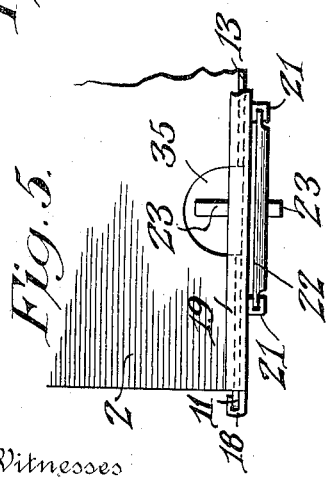
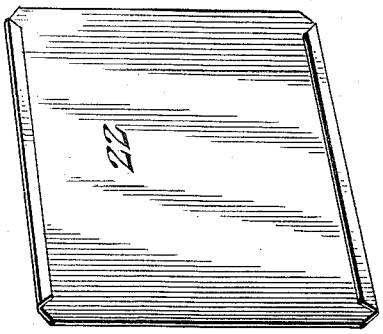
Louis W. Mittendorff, Inventor
Witnesses

UNITED STATES PATENT OFFICE.

LOUIS W. MITTENDORFF, OF YORK, NEBRASKA.

NEST.

1,038,627.     Specification of Letters Patent.     Patented Sept. 17, 1912.

Application filed January 29, 1910. Serial No. 540,877.

*To all whom it may concern:*

Be it known that I, LOUIS W. MITTENDORFF, a citizen of the United States, residing at York, in the county of York and State of Nebraska, have invented a new and useful Nest, of which the following is a specification.

This invention relates to improvements in nests for laying hens which may be utilized as brooding coops, and one object of the invention is to provide a nest which may be readily collapsed so as to be shipped or stored in a knocked down condition.

A further object of the invention is to provide a nest in which the hen will be automatically trapped upon entering the nest, and will be confined therein until removed by the owner so that the identification of the egg with the hen that laid it will be certain, and the pedigree of the chicken hatched from the egg will not be lost.

A further object of the invention is to provide a device which may be manufactured at a small cost, which may be readily assembled or dismembered, and which, when in use, will be thoroughly proof against rats or vermin which might injure the hen or destroy the egg.

All of these objects and such other objects as will hereinafter appear are attained in the use of the device illustrated in the accompanying drawings, and the invention consists in certain novel features thereof which will be hereinafter first fully described and then specifically pointed out in the appended claims.

In the drawings, Figure 1 is a front elevation of a nest embodying my invention, showing two entrances, with the door of one of the entrances raised and the door of the other entrance lowered. Fig. 2 is a horizontal section taken on the line 2—2 of Fig. 1. Fig. 3 is a transverse vertical section taken on the line 3—3 of Fig. 1. Fig. 4 is a longitudinal vertical section taken on line 4—4 of Fig. 3. Fig. 5 is a detail plan view of a portion of the nest. Fig. 6 is a detail perspective view of the trigger or trip by which the dor is automatically released. Fig. 7 is a detail perspective view of the transverse partition which forms the front of the nest proper. Figs. 8, 9 and 10 are detail perspective views of different forms of doors.

In the accompanying drawings, I have illustrated the invention as embodied in a double nest, that is, a nest in which there are two compartments, but it will be understood, of course, that such showing is merely typical and that no departure from the invention will be involved in applying the same to a nest having but a single compartment or a nest having any greater number of compartments.

In carrying out my invention, I construct the body of the nest of sheet metal in two members constituting the ends 1 of the nest and each member forming part of the top and bottom of the nest, the top of the nest being shown at 2 and the bottom thereof indicated at 3. The meeting edges of the top and bottom of the nest are so shaped as to provide the interlocking joint 4 whereby the two members may be slid endwise together, and, when in engagement, will be held firmly against transverse separation. The joint, as will be readily understood, is formed by providing one member of the body with an overhanging flange 5, and the other member with a flange 6 extending upward and then outward from the body so as to fit around the overhanging flange 5 of the meeting member, the said flange 6 being further provided with an inturned tongue 7 engaging under the overhanging flange 5, as clearly shown in Fig. 4. The central partition 8, of sheet metal, is engaged in and supported by U-shaped flanges or guides 9 formed on the inner faces of the top and bottom of the body members, as shown in Fig. 4, the partition being pushed endwise into engagement with the said guides so as to fit between the top and bottom of the members and also between the end and back of the nest. In order to reinforce the partition, the edges of the same are doubled on themselves, as shown at 10, so as to provide a slightly wider bearing surface, which will prevent cutting of the fingers by the partition when the same is being pushed into place. The body members are also provided at the front and rear edges of the ends 1 with outstanding flanges 11, and at the front and rear edges of the bottom, the said body member are provided with grooved flanges 12, as shown, the front and rear edges of the top of the body members being provided with straight flanges 13 similar to the flanges 11 on the ends of the members.

The back of the nest, 15, is composed of a sheet metal plate having its upper edge provided with an overhanging inverted U-shaped flange 15 adapted to fit over the upturned flange 13 on the top of the body member, as shown in Fig. 3, while the lower edge of the back plate is adapted to rest in the grooved flange 12, as shown in the same figure. It will be seen at once that by this construction the back of the device is detachably engaged with and supported by the body members, so that it may be readily lifted therefrom when it is desired to dismember the device, and in order to prevent the said back plate from slipping laterally from its engagement with the top and bottom of the body members, the sides or end edges of the said back plate are formed into U-shaped grooves 16 which engage the outstanding flanges 11 on the ends of the body members, whereby lateral movement of the back plate relative to the body members will be positively prevented, as will be readily understood on reference to Fig. 2. The front 17 of the device is constructed of a sheet metal plate similar in shape and size to the back plate 14 and likewise provided at its ends with flanges 18 adapted to engage the flanges 11 on the ends of the body members, and with an over-hanging flange 19 at its upper edge adapted to engage the upstanding flange 13 of the body members. The front plate will thus be prevented from moving away from the body of the device in the same manner as the back plate, while at the same time it may be readily lifted vertically out of its engagement with the said body members when it is desired to ship or store the device in a small compass.

The front plate is provided with openings 20 forming entrances to the nest chambers or compartments, and on the outer face of the said front plate, coincident with the side edges of these openings, are cleats or guides 21 in which are slidably mounted doors 22 adapted to close the openings 20 and thereby confine the hen within the nest chamber. The door 22 is normally supported in its raised position by a trigger 23 mounted transversely in a suitable support 24 on the inner face of the front plate in such position that the trigger will project through the opening 20 at the top of the same. This trigger 23 is provided with a downturned lip 25 at its front end and with an elongated slotted portion 26 at its rear end, the said lip 25 being adapted to engage the support or guide 24 and thereby prevent the trigger being drawn therethrough when the hen enters the nest, and the slotted portion 26 being engaged by the trip or lever 27 so as to be actuated thereby when the hen passes through the entrance 20. This trip lever 27 consists of a light wire frame having a central loop 28 which engages the slotted portion 26 of the trigger and side arms 29 which extend below the trigger, and, in their normal position, block the entrance opening 20 so that the hen cannot enter the compartment without pushing the said lever inward and thereby drawing the trigger in the same direction, whereupon the door 22, normally supported by the trigger, as shown in Fig. 3, will drop so as to cover the entrance and thereby prevent the hen passing from the compartment. The lever 27 is hinged or pivotally supported upon the inner face of the front of the device, as shown at 30, by having the transverse shoulders at its upper end passed through suitable keepers on the front plate of the device, as will be readily understood on reference to Figs. 4 and 6.

In order to provide a suitable nest in which the hen may deposit the egg, I provide a transverse partition 31 of sheet metal which is bowed or curved so that when in position, it will project toward the front of the device and is provided at its ends with lips or hooks 32 adapted to engage guides or cleats 33 on the sides of the nest chamber. In the form of the device illustrated, one of these cleats or guides 33 is provided on each side of the partition 8 and one on the inner side of each end of the device. These guides or cleats 33 are arranged at the bottom of the partition or the end wall of the nest and are of sufficient height to securely hold the transverse partition 31, but do not extend upward to such a degree as to interfere with the movements of the hen or with the insertion of the partition 8 into or its withdrawal from the device. It will be observed, on reference to Fig. 2, that these cleats have inwardly converging walls and that the lips at the ends of the partition are in the form of hooks. This construction permits the use of sheet metal, and at the same time holds the partition in such positive engagement with the cleats that it can not be accidentally dislodged therefrom.

The construction and arrangement of the several parts of the device being thus made known, it is thought the advantages and operation of the same will be readily understood and appreciated. The doors 22 are normally supported in raised position by the trigger 25, as shown in Figs. 1 and 3, and the trip lever 27 will extend downward so as to bar the entrance opening 20, as shown and as will be readily understood. In order to prevent breakage of the egg, a covering of straw may be placed behind the partition 31 and this straw packing or covering will serve to attract the hen, so that she will naturally enter the nest when about to lay. As the hen passes through the entrance opening, her body will strike against the lower end of the trip lever and the said lever will thereby be swung inward and upward so as to draw the trigger 25 inward and release the door 22, which will at once drop by gravity to the lower ends of the cleats or guides 21 and be thereby supported in position to cover the entrance opening, it being understood that the lower ends of the cleats or guides are provided with stops or shoulders 34 to support the doors in their lower position. It will be noted that the door is of such dimensions that a slight space will be left between the upper edge of the door and the upper side of the entrance opening in order that proper light and ventilation may be provided for the nest chamber or compartment. As the hen passes into the nest chamber, the trip lever 27 will be at once swung inward, but owing to the provision of the slot 26 in the trigger, the trigger will not be immediately drawn inward and will remain at rest until the trip lever engages the rear end of the said slot, thereby permitting the hen to enter the nest before the door is released, and consequently avoiding liability of injury to the hen by the falling door. After the door has been lowered and the hen has passed over and behind the partition 31, the trip lever and the trigger will return to their initial positions and the trigger will then project over the edge of the door so that the door cannot be raised by any effort of the hen to escape. The hen will consequently be confined within the nest until the owner has released her, so that the identification of the egg with the hen will be complete.

In order to permit the front plate to be removed from the nest without first detaching the trigger and the trip lever, an opening 35 is formed in the top of the device so that the trigger may readily pass through the top without any necessity of being detached from the front plate. Likewise, the assembling of the front plate with the other parts of the nest will be facilitated, inasmuch as the trigger and the trip lever may be shipped detached from the rest of the nest but without requiring the separation of the trigger and the trip lever from the front plate, the slotted connection of the trigger with the trip lever permitting the said parts to lie flat against the front plate when the same is stored or shipped.

While the device is intended more particularly for use as a nest, it is also capable of use as a brooding chamber for a hen and chickens, and in order to provide for such use of the device, I purpose supplying the same with a door 36 covered with wire netting or screen 37 and also with an open door frame 38 across which spaced wires 39 extend in order that either one of these doors may be substituted for the solid door 22 to admit sufficient light and air to the interior of the device when the same is being used as a brooder.

The device is preferably constructed of sheet metal so that it will be proof against the attacks of rats, vermin or other pests which may affect the hen or destroy the egg, and it will be noted that it is entirely free of any nails or similar fastenings which would tend to leave projecting points, liable to lacerate the hen in passing to and from the nest chamber. The assembling and disassembling of the parts will require but a few minutes time, inasmuch as the several parts are held together by sliding joints, and the joints are so arranged that the parts will not separate until they are subjected to the action of the owner in intentionally setting up or taking down the nest.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. A knock-down nest comprising a body portion composed of two members joined intermediately and each including one end of the body member and a portion of the top and bottom, and removable front and back members each slidable along the end members transversely to the top members and toward and from the bottom members, the latter having marginal grooved flanges for receiving the corresponding edges of the front and back members, and the said front and back members having marginal flanges receiving corresponding portions of the end and top members.

2. The combination of a body having grooved flanges at its lower edges and upstanding flanges at its upper edges, a back plate provided at its upper edge with an overhanging flange adapted to engage the upstanding flange on the body and having its lower edge adapted to rest in the grooved flange at the lower edge of the body, a front plate provided with an overhanging flange engaging the upstanding flange at the top of the body and having its lower edge resting in the grooved flange at the lower edge of the body, and a door carried by the said front plate.

3. A knock-down nest comprising a body portion composed of two members joined intermediately and each including one end of the body member and a portion of the top and bottom, and removable front and back members each slidable along the end members transversely to the top members and toward and from the bottom members, the latter having marginal grooved flanges for receiving the corresponding edges of the front and back members, and the said front and back members having marginal flanges receiving corresponding portions of the end and top members, a top and a bottom member where joined to the mating top and bottom member being provided with U-shaped guides, and there being also provided a partition adapted to slidably engage in said guides and held thereto between the back and front members.

4. A knock-down nest comprising a body portion composed of two members joined intermediately and each including one end of the body member and a portion of the top and bottom, and removable front and back members each slidable along the end members transversely to the top members and toward and from the bottom members, the latter having marginal grooved flanges for receiving the corresponding edges of the front and back members, and the said front and back members having marginal flanges receiving corresponding portions of the end and top members, a top and bottom member where joined to the mating top and bottom member being provided with U-shaped guides, and there being also provided a partition adapted to slidably engage in said guides and held thereto between the back and front members, the front member having openings therein with guides on opposite sides, and doors slidably mounted in said guides.

5. The combination of a nest body, a removable front plate therefor, a door slidably mounted on said front plate, a trigger mounted for transverse movement in the front plate and adapted to support the door, and a lever hung on the front plate in a normally pendent position and connected with the trigger to release the latter, the said lever having an initial extent of idle movement with reference to the trigger.

6. The combination of a nest body, a front plate therefor, a door slidably mounted on said front plate, a trigger mounted on the front plate for transverse movement with relation thereto and adapted to support the door, said trigger having a slotted portion at the end remote from the door engaging portion, and a normally pendent trip lever pivotally mounted on the front plate and engaging the slotted portion of the trigger, said lever extending in transverse relation to the door opening and having an idle movement relative to said trigger corresponding to the length of the slot in the trigger.

7. The combination of a nest body, a front plate therefor, a door slidably mounted on the front plate, a trigger mounted transversely in the front plate and provided at its front end with a depending lip and at its rear end with a longitudinal slot, and a trip lever pivotally hung on the front plate and having a shoulder playing in the longitudinal slot of the trigger.

In testimony, that I claim the foregoing as my own, I have hereto affixed my signature in the presence of two witnesses.

LOUIS W. MITTENDORFF.

Witnesses:
GEO W. NEILLY,
CHAS. F. GILBERT.

---

Copies of this patent may be obtained for five cents each, by addressing the "Commissioner of Patents, Washington, D. C."